United States Patent

Haase et al.

[11] 4,013,633
[45] Mar. 22, 1977

[54] YELLOW AZOPYRAZOLINE DYE RELEASING REDOX COMPOUNDS FOR PHOTOGRAPHIC COLOR TRANSFER

[75] Inventors: Jan R. Haase; Carl H. Eldredge; Richard A. Landholm, all of Rochester, N.Y.

[73] Assignee: Eastman Kodak Company, Rochester, N.Y.

[22] Filed: June 27, 1975

[21] Appl. No.: 590,899

[52] U.S. Cl. .................... 260/162; 96/17; 96/29 D; 96/73; 96/99; 260/159; 260/160; 260/163; 260/556 C
[51] Int. Cl.$^2$ ............... C09B 29/34; C09B 29/38; G03C 1/10; G03C 1/76
[58] Field of Search .......... 260/160, 162, 163, 159, 260/147; 96/29 D, 73, 17, 99

[56] References Cited

UNITED STATES PATENTS

| | | | |
|---|---|---|---|
| 3,148,062 | 9/1964 | Whitmore et al. | 260/162 X |
| 3,288,778 | 11/1966 | Blout et al. | 260/163 |
| 3,751,406 | 8/1973 | Bloom | 260/162 |
| 3,923,779 | 12/1975 | Curtis | 260/202 |
| 3,928,312 | 12/1975 | Fleckenstein | 260/156 |

*Primary Examiner*—Floyd D. Higel
*Attorney, Agent, or Firm*—Elliott Stern; Daniel B. Reece III

[57] ABSTRACT

A photosensitive element comprising a support having thereon at least one photosensitive silver halide emulsion layer and one of said layers having associated therewith a yellow image dye-releasing compound having a formula as follows

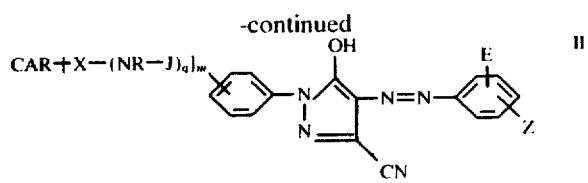

or

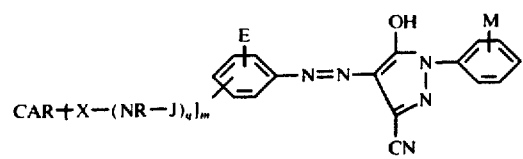

wherein Car represents a sulfonamidophenol or sulfonamidonaphthol carrier moiety which, as a function of oxidation under alkaline conditions, releases a diffusible dye from said compound.

X represents a bivalent linking group of the formula —R$^1$—L$_n$—R$^1{}_p$— where each R$^1$ can be the same or different and each represents alkylene phenylene; or substituted phenylene; L represents a bivalent radical selected from oxy, carbonyl, carboxamido, carbamoyl, sulfonamido, sulfamoyl, sulfinyl or sulfonyl; $n$ is an integer having a value of 0 or 1; $p$ is 1 when $n$ equals 1 and $p$ is 1 or 0 when $n$ equals 0, provided that when $p$ is 1 the carbon content of the sum of both R radicals does not exceed 14 carbon atoms;

R represents hydrogen or alkyl;

J represents a bivalent radical selected from sulfonyl or carbonyl;

$m$ and $q$ each represent an integer having a value of 0 or 1;

E represents hydrogen, halogen, alkyl or alkoxy;

Z represents hydrogen or an electron withdrawing group selected from cyano, trifluoromethyl, alkylsulfonyl, substituted alkylsulfonyl, phenylsulfonyl, or substituted phenylsulfonyl; a carboxylic acid ester having the formula —COOR$^2$ wherein R$^2$ is alkyl, phenyl or substituted phenyl; sulfo, a sulfamoyl radical having the formula —SO$_2$NR$^3$R$^4$ wherein R$^3$ represents hydrogen or alkyl, and R$^4$ represents hydrogen, alkyl, substituted alkyl; benzyl, phenyl, substituted phenyl; alkylcarbonyl, or phenylcarbonyl, with the proviso that the carbon content of the sum of R$^3$ and R$^4$ not exceed 14 carbon atoms; a carbamoyl radical having the formula —CON(R$^3$)$_2$ wherein each R$^3$ can be the same or different and is as described previously; and M represents hydrogen, a solubilizing group or precursor thereof selected from carboxy, sulfo, a sulfamoyl radical as described for Z or a carboxylic acid ester as described for Z.

17 Claims, No Drawings

YELLOW AZOPYRAZOLINE DYE RELEASING REDOX COMPOUNDS FOR PHOTOGRAPHIC COLOR TRANSFER

This invention relates to the art of photography and more particularly to color diffusion transfer photography employing yellow azopyrazolone dye-releasing o- or p-sulfonamidophenol and o- or p-sulfonamidonaphthol compounds.

Fleckenstein et al, U.S. application Ser. No. 351,673, filed Apr. 16, 1973, entitled Photographic Systems, and incorporated herein by reference, describes dye-release mechanisms for photographic imaging which do not require the use of a color developing agent and which employ a nondiffusible p-sulfonamidophenol or p-sulfonamidonaphthol which is alkali cleavable upon oxidation to release a diffusible color providing moiety which diffuses a dye image receiving layer. Additional sulfonamidophenols and sulfonamidonaphthols are disclosed in Fleckenstein et al U.S. application Ser. No. 503,144 filed Sept. 4, 1974. In the color transfer process generally and particulary in the integral-negative-receiver (INR) format described in Example 40 of Fleckenstein et al, U.S. application Ser. No. 351,673, the dye-releasing redox compounds (DRR's) advantageously possess the following properties:
 a. rapid oxidation in the presence of a 3-pyrazolidone-silver halide redox couple;
 b. rapid cleavage of the oxidized form by alkali;
 c. stability on long-time storage and to high pH processing conditions;
 d. immobility before processing and dye-release; and
 e. solubility in high boiling, water-immiscible solvents for ease in dispersing in gelatin layers.

Besides the desirable properties of the DRR's themselves, the released dyes must have the following additional properties:
 a. diffusion: through gelatin and other components of the INR element;
 b. hue: suitable Xmax, half band width and absence of unwanted absorption;
 c. chemical stability;
 d. solubility at high pH;
 e. mordantability at high pH;
 f. permanence: non-wandering on mordant at neutral pH;
 g. hue stability over pH ranges of the system;
 h. light stability;
 i. hue stability in changing environments: wet initial transfer to dry final print; and
 j. low solubility at low pH.

The yellow DRR compount XLI described in Example 40 of Fleckenstein et al releases a dye which does not have the hue stability over the pH range of this system. The pKa of this release dye is such that the dye is partially protonated within an hour or so after transfer in the laminated unit. Protonation causes a shift in absorption to a shorter wavelength causing a substantial drop in the reflection yellow dye density on the receiving layer of the laminated film unit. It has been found that sulfonamidophenol dye-releasing redox compounds derived from 3-cyano-1-phenyl-2-pyrazolin-5-one have especially suitable absorption spectra and hue stability throughout the pH range to which they are subjected. These dyes are well mordanted on cationic mordants and have excellent light stability and are far superior to the axo-pyrazolone dyes disclosed in Fleckenstein et al. Accordingly, we have provided a new class of sulfonamidophenolic and sulfonamidonapholic compounds which when oxidized are capable of releasing a novel yellow azopyrazolone dye of this invention. These dye-releasing redox compounds according to the invention are utilized in a photosensitive element which comprises a support having thereon at least one photosensitive silver halide emulsion layer and at least one of said layers having associated therewith a nondiffusible sulfonamidophenol compound of the invention having a color-providing moiety attached to the sulfonamido group.

The sulfonamido dye-releasing redox compounds which release a preferred class of yellow axopyrazolone dyes can be represented by the following formulas:

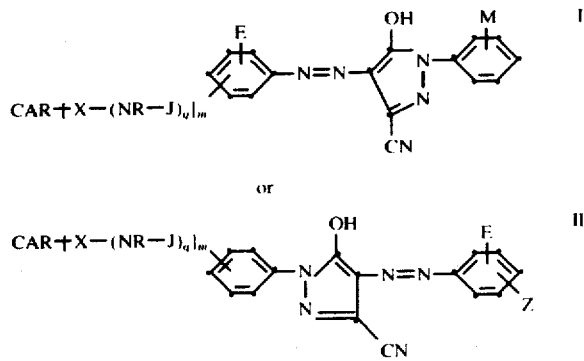

wherein

CAR represents a ballasted o- or p-sulfonamidophenol or o- or p-sulfonamidonaphthol carrier moiety which, as a function of oxidation under alkaline conditions, releases a diffusible dye from said compound;

X represents a bivalent linking group of the formula —$R^1$—$L_n$—$R^1_p$— where each $R^1$ can be the same or different and each represents alkylene having 1 to about 8 carbon atoms; phenylene; or substituted phenylene having 6 to about 9 carbon atoms; L represents a bivalent radical selected from oxy, carbonyl, carboxamido, carbamoyl, sulfonamido, sulfamoyl, sulfinyl or sulfonyl; $n$ is an integer having a value of 0 or 1; $p$ is 1 when $n$ equals 1 and $p$ is 1 or 0 when $n$ equals 0, provided that when $p$ is 1 the carbon content of the sum of both R radicals does not exceed 14 carbon atoms;

R represents a hydrogen atom, or alkyl having 1 to about 6 carbon atoms;

J represents a bivalent radical selected from sulfonyl or carbonyl;

$m$ and $q$ each represent an integer having a value of 0 or 1;

E represents hydrogen, chloro, bromo, fluoro, alkyl having 1 to about 4 carbon atoms or alkoxy having 1 to about 4 carbon atoms;

Z represents hydrogen or an electron withdrawing group selected from cyano, trifluoromethyl, a carboxylic acid ester having the formula —$COOR^2$ wherein $R^2$ is alkyl having 1 to about 18 carbon atoms, phenyl or substituted phenyl having 6 to about 18 carbon atoms; sulfo, a sulfamoyl radical having the formula —$SO_2NR^3R^4$ wherein $R^3$ represents hydrogen or alkyl having 1 to about 6 carbon atoms and $R^4$ represents hydrogen, alkyl having 1 to about 6 carbon atoms, substituted alkyl having 1 to about 6 carbon atoms, benzyl, phenyl, substituted phenyl having 6 to about 9 carbon atoms, alkylcarbonyl having 1 to about 8 carbon atoms, or phenylcarbonyl having 6 to about 9 carbon atoms, with the proviso that the carbon content of the sum of $R^3$ and $R^4$ not exceed 14 carbon atoms; a carbamoyl radical having the formula —CON($R^3$)$_2$ wherein each $R^3$ can be the same or different and is as described previously; alkyl- or substituted alkylsulfonyl having 1 to about 8 carbon atoms, phenyl- or substituted phenylsulfonyl having 6 to about 9 carbon atoms; and M represents hydrogen, a solubilizing group or precursor thereof selected from carboxy, sulfo, a sulfamoyl radical as described for Z or a carboxylic acid ester as described for Z.

Examples of bivalent alkylene linking groups representative of $R^2$ are —CH$_2$—, —C$_2$H$_4$—, —C$_6$H$_{12}$—, —C$_3$H$_6$—, —C$_4$H$_8$—, etc., as well as branched alkylene radicals such as

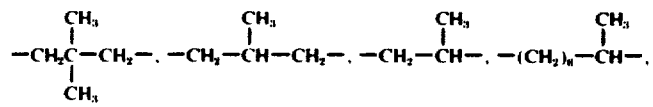

etc.

References hereinafter to $o$, $m$ and $p$ mean that either the ortho, meta or para radicals are indicated, as the case may be.

Examples of phenylene and substituted phenylene radicals representative of $R^2$ are m,p-phenylene, m,p-phenylene substituted with chloro, methoxy, butoxy, bromo, cyano, nitro, methyl, ethyl, carboxy, sulfo, amino, etc.

As used herein the oxygen- or sulfur-containing bivalent radicals representative of L are oxy (—O—), carbonyl (—CO—), carboxamido (—CONH—), carbamoyl (—NHCO—), sulfonamido (—SO$_2$NH—), sulfamoyl (—NHSO$_2$—), sulfinyl (—SO—) and sulfonyl (—SO$_2$—). Therefore, non-limiting examples of bivalent linking groups which may be represented by X are —CH$_2$—O—CH$_2$—,

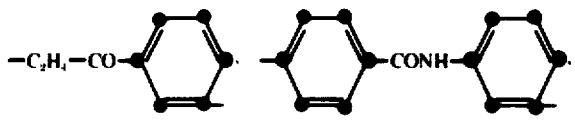

—C$_3$H$_6$—NHCO—c$_4$H$_8$—,

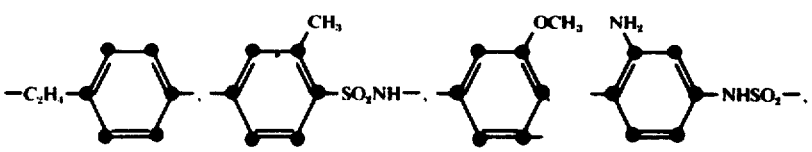

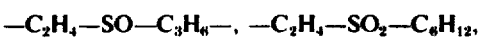

—C$_2$H$_4$—SO—C$_3$H$_6$—, —C$_2$H$_4$—SO$_2$—C$_6$H$_{12}$,

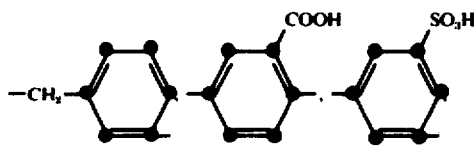

etc.

Examples of the groups which R may represent are hydrogen, methyl, ethyl, isopropyl, pentyl, hexyl, etc.

The alkyl group represented by R may additionally be substituted with cyano, hydroxy, methoxy, etc.

Examples of substituents which E may represent are hydrogen, chloro, bromo, fluoro, methyl, ethyl, butyl, isopropyl, pentyl, etc., methoxy, ethoxy, butoxy, isopropoxy, etc.

Examples of substituents which Z may represent are hydrogen or electron withdrawing groups such as a cyano radical (—CN), a trifluoromethyl radical (—CF$_3$), a carboxylic acid ester such as —COOCH$_3$, —COOC$_{11}$H$_{23}$, —COOC$_2$H$_5$, —COOC$_6$H$_5$,

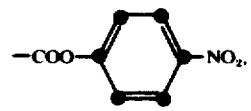

—COOC$_{12}$H$_{25}$,

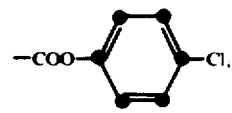

etc.; a carboxy radical including salts thereof, such as alkali metal salts or photographically inactive ammonium salts (e.g., —COOH, —COO$^-$Li$^+$, —COO$^-$K$^+$, —COO$^-$Na$^+$, —COO$^-$NH$_4^+$, etc.), a sulfo radical including salts thereof, such as alkali metal or photographically inactive ammonium salts, (e.g., —SO$_3$H, —SO$_3^-$L$^+$, SO$_3^-$K$^+$, —SO$_3^-$Na$^+$, —SO$_3^-$NH$_4^+$, etc.); —SO$_2$NH$_2$, —SO$_2$NHCH$_3$, —SO$_2$NHC$_2$H$_5$, —SO$_2$N(CH$_3$)$_2$, —SO$_2$NHCH$_2$C$_6$H$_5$,

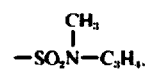

—SO$_2$NHC$_2$H$_4$OH,

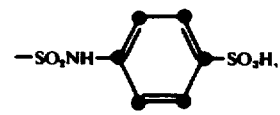

—SO$_2$NHC$_6$H$_5$, —SO$_2$NHC$_2$H$_4$CN, —SO$_2$NHCOC$_6$H$_5$, —SO$_2$NHCOCH$_3$, —SO$_2$NHCOC$_3$H$_7$,

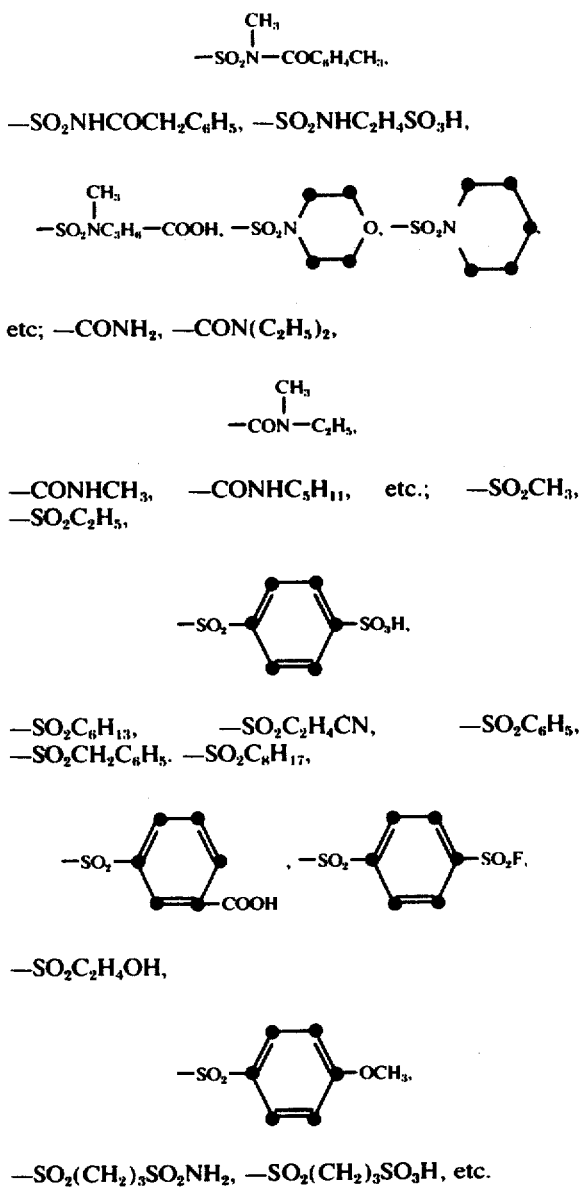

—$SO_2(CH_2)_3SO_2NH_2$, —$SO_2(CH_2)_3SO_3H$, etc.

Examples of substituents which M may represent are hydrogen or solubilizing groups or precursors thereof such as carboxy radical including salts thereof or photographically inactive ammonium salts (e.g., —COOH, —COO⁻Li⁺, —COO⁻K⁺, —COO⁻$C_5H_6N^+$ (pyridinium), —COO⁻HN($C_2H_5$)$_3^+$, etc.), a sulfo radical as described for Z, a sulfamoyl radical as described for Z or a carboxylic acid ester as described for Z.

Preferred compounds are those having Formulas I and II above wherein

Car has the formula

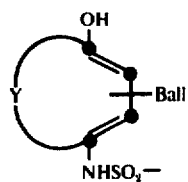

Ball represents an organic ballasting group containing at least 8 carbon atoms which renders said compound nondiffusible in the photographic element during development in an alkaline processing composition;

Y represents the carbon atoms necessary to complete a benzene or naphthalene nucleus;

$R^1$ represents alkylene having 1 to about 4 carbon atoms, phenylene or phenylene substituted with carboxy, chloro, methyl or methoxy;

L represents sulfamoyl, sulfonamido, carbamoyl or carboxamido;

R represents hydrogen;

q is an integer having a value of 1;

m is an integer having a value of 1 or 0;

E represents hydrogen, chloro, methoxy, ethoxy, propoxy or isopropoxy;

Z represents cyano, alkylsulfonyl having 1 to about 6 carbon atoms, alkylsulfonyl having 1 to about 6 carbon atoms substituted with hydroxy, phenyl, cyano, sulfamoyl, carboxy, fluorosulfonyl or sulfo; phenylsulfonyl; phenylsulfonyl substituted with hydroxy, sulfamoyl, fluorosulfonyl, carboxy or sulfo; a sulfamoyl radical having the formula —$SO_2NHR^4$ wherein $R^6$ is hydrogen, alkyl having 1 to about 4 carbon atoms, phenyl; or a carbamoyl radical having the formula —$CON(R^3)_2$ wherein $R^3$ is hydrogen or methyl; and M represents hydrogen, a carboxylic acid ester having the formula —$COOR^2$ wherein $R^2$ is alkyl having 1 to about 4 carbon atoms, phenyl; or a sulfamoyl radical having the formula —$SO_2NHR^4$ wherein $R^4$ is hydrogen, alkyl having 1 to about 4 carbon atoms or phenyl.

Especially preferred compounds are those having Formula I and II above wherein Car[X—(NR—J)$_q$]-$_m$ is in the meta position relative to the azo linkage in Formula I, and in the para position relative to the pyrazolone nitrogen in Formula II.

Of these compounds, those wherein

Y represents the atoms necessary to complete a naphthalene nucleus;

Z represents alkylsulfonyl having 1 to about 8 carbon atoms, cyano, or a sulfamoyl radical having the formula —$SO_2NHR^4$ wherein $R^4$ is alkyl having 1 to about 4 carbon atoms; and M is hydrogen, are even more preferred.

Of these compounds, those wherein E represents hydrogen, chloro, or methoxy; and Z represents —$SO_2CH_3$ are of special interest.

Another group of especially preferred compounds are those having Formulas I and II above wherein X is

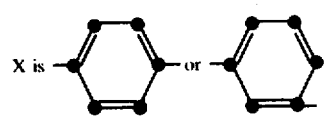

J is —$SO_2$—; and q is 1.

Of this group, those compounds wherein

Y represents the atoms necessary to complete a naphthalene nucleus;

Z represents alkylsulfonyl having 1 to about 6 carbon atoms, cyano or a sulfamoyl radical having the formula —$SO_2NHR^4$ wherein $R^4$ is alkyl having 1 to about 4 carbon atoms; and M is hydrogen are most preferred.

Of this group those compounds wherein E represents hydrogen, chloro or methoxy; and Z represents —SO₂CH₃, cyano or —SO₂N(CH₃)₂ have the most advantageous properties.

As indicated above preferred compounds are those having Formulas I and II above wherein Car— represents a radical of the formula:

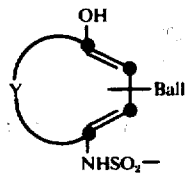
III.

wherein Ball and Y are as described above. When Y represents the atoms necessary to complete a naphthalene nucleus, Ball can be attached to either ring thereof. Examples of some preferred carriers are as follows:

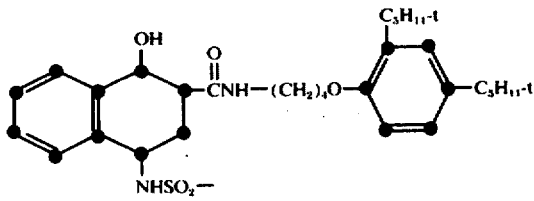

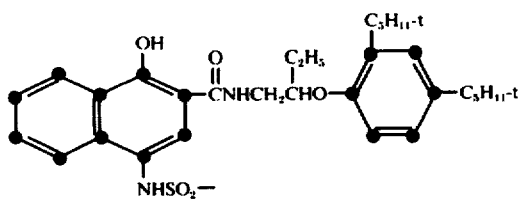

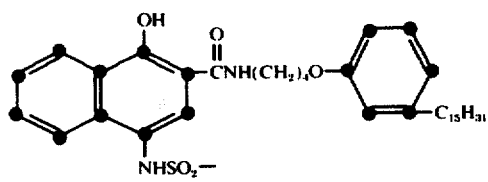

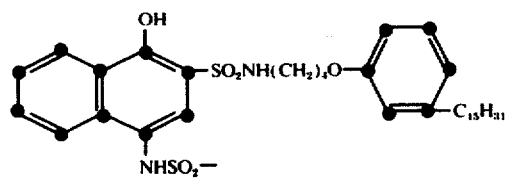

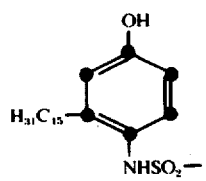

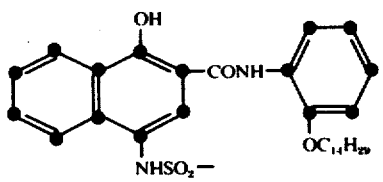

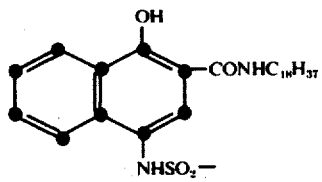

-continued

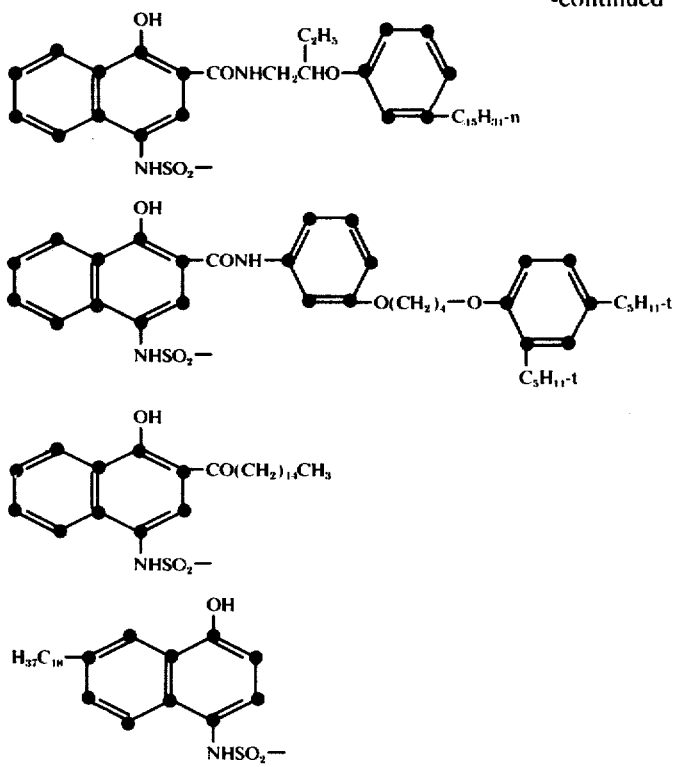

The nature of the ballast group (Ball) in the Formula III for the compouds described above is not critical as long as it confers nondiffusibility to the compounds. Typical ballast groups include long straight or branched chain alkyl radicals linked directly or indirectly to the compound as well as aromatic radicals of the benzene and naphthalene series indirectly attached or fused directly to the benzene nucleus, etc. Useful ballast groups generally have at least 8 carbon atoms such as a substituted or unsubstituted alkyl group of 8 to 22 carbon atoms, an amide radical having 8 to 30 carbon atoms, a keto radical having 8 to 30 carbon atoms, etc., and may even comprise a polymer backbone. As previously indicated, preferred compounds are those wherein the ballast is attached to the benzene nucleus through a carbamoyl radical (—NHCO—) or a sulfamoyl radical (—SO$_2$NH—) in which the nitrogen is attached to the ballast group.

In addition to the ballast, the benzene nucleus in the above formula may have groups or atoms attached thereto such as the halogens, alkyl, aryl, alkoxy, aryloxy, nitro, amino, alkylamino, arylamino, amido, cyano, alkylmercapto, keto, carboalkoxy, heterocyclic groups, etc.

The yellow dyes which are released from the above carrier moieties as a function of oxidation under alkaline conditions may be represented by the following formulas

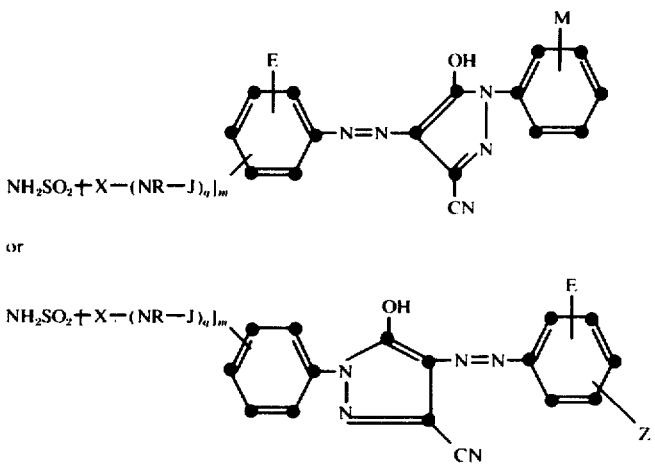

wherein X, R, $q$, $m$, E, M and are as described previously.

A suitable process for producing a photographic transfer image in color using the compounds of our invention, for example those wherein Car is as shown in Formula III, comprises the steps of:

1. treating the above-described photosensitive element with an alkaline processing composition in the presence of a silver halide developing agent to effect development of each of the exposed silver halide emulsion layers, thereby oxidizing the developing agent and the oxidized developing agent in turn cross-oxidizing the sulfonamido compound;

2. forming an imagewise distribution of diffusible released dye as a function of the imagewise exposure of each of the silver halide emulsion layers by cleaving each cross-oxidized sulfonamido compound;

3. diffusing to a dye image-receiving layer at least a portion of each of the imagewise distributions of diffusible released dye to provide an image.

The photosensitive element in the above-described process can be treated with an alkaline processing composition to effect or initiate development in any manner. A preferred method for applying processing composition is by use of a rupturable container or pod which contains the composition. In general, the processing composition employed in our system contains the developing agent for development, although the composition could also just be an alkaline solution where the developer is incorporated in the photosensitive element, in which case the alkaline solution serves to activate the incorporated developer.

A photographic film unit according to our invention which is adapted to be processed by passing the unit between a pair of juxtaposed pressure-applying members, comprises:

1. a photosensitive element as described above;
2. a dye image-receiving layer; and
3. means for discharging an alkaline processing composition within the film unit such as a rupturable container which is adapted to be positioned during processing of the film unit so that a compressive force applied to the container by the pressure-applying members will effect a discharge of the contents of the container within the film unit;

the film unit containing a silver halide developing agent.

The dye image-receiving layer in the above-described film unit can be located on a separate support adapted to be superposed on the photosensitive element after exposure thereof. Such image-receiving elements are generally disclosed, for example, in U.S. Pat. No. 3,362,819. When the means for discharging the processing composition is a rupturable container, typically it is positioned in relation to the photosensitive element and the image-receiving element so that a compressive force applied to the container by pressure-applying members, such as found in a camera designed for in-camera processing, will effect a discharge of the contents of the container between the image-receiving element and the outermost layer of the photosensitive element. After processing, the dye image-receiving element is separated from the photosensitive element.

The dye image-receiving layer in the above-described film unit can also be located integral with the photosensitive silver halide emulsion layer. One useful format for integral receiver-negative photosensitive elements is disclosed in Belgian Pat. No. 757,960 and Canadian Pat. No. 928,560. In such an embodiment, the support for the photosensitive element is transparent and is coated with an image-receiving layer, a substantially opaque light reflective layer, e.g., $TiO_2$, and then the photosensitive layer of layers described above. After exposure of the photosensitive element, a rupturable container containing an alkaline processing composition and an opaque process sheet are brought into superimposed position. Pressure-applying members in the camera rupture the container and spread processing composition over the photosensitive element as the film unit is withdrawn from the camera. The processing composition develops each exposed silver halide emulsion layer and dye images are formed as a function of development which diffuse to the image-receiving layer to provide a position, right-reading image which is viewed through the transparent support on the opaque reflecting layer background.

Another format for integral negative-photosensitive elements in which the present invention can be employed is disclosed in Belgian Pat. No. 757,959 and Canadian Pat. No. 928,559. In this embodiment, the support for the photosensitive element is transparent and is coated with the image-receiving layer, a substantially opaque, light-reflective layer and the photosensitive layer or layers described above. A rupturable container containing an alkaline processing composition and an opacifier is positioned adjacent to the top layer and a transparent top sheet. The film unit is placed in a camera, exposed through the transparent top sheet and then passed through a pair of pressure-applying members in the camera as it is being removed therefrom. The pressure-applying members rupture the container and spread processing composition and opacifier over the negative portion of the film unit to render it light insensitive. The processing composition develops each silver halide layer and dye images are formed as a result of development which diffuse to the image-receiving layer to provide a right-reading image that is viewed through the transparent support on the opaque reflecting layer background.

Still other useful integral formats in which the sulfonamido compounds can be employed are described In U.S. Pat. Nos. 3,415,644; 3,415,645; 3,415,646; 3,647,437; and 3,635,707.

The film unit or assembly of the present invention can be used to produce positive images in single or multicolors. In a three-color system, each silver halide emulsion layer of the film assembly will have associated therewith an image dye-providing material possessing a predominant spectral absorption within the region of the visible spectrum to which said silver halide emulsion is sensitive, i.e., the blue-sensitive silver halide emulsion layer will have a yellow image dye-providing material associated therewith, the green-sensitive silver halide emulsion layer will have a magenta image dye-providing material associated therewith, and the red-sensitive silver halide emulsion layer will have a cyan image dye-providing material associated therewith. The image dye-providing material associated with each silver halide emulsion layer can be contained either in the silver halide emulsion layer itself or in a layer contiguous to the silver halide emulsion layer. The yellow image dye-providing material will, of course, be a compound of this invention. The magenta and cyan image dye-providing materials can be selected from a variety of materials such as those compounds described by Fleckenstein et al U.S. Ser. No. 351,673, mentioned previously. Additionally useful magenta image dye-providing materials are described in U.S. Pat. No. 3,954,476, issued May 4, 1976.

The concentration of the compounds, which preferably are alkali-cleavable upon oxidation, that are employed in the present invention can be varied over a wide range depending upon the particular compound employed and the results which are desired. For example, the image dye-providing compounds of the present invention can be coated in layers as dispersions in a hydrophilic film-forming natural or synthetic polymer, such as gelatin, polyvinyl alcohol, etc., which is adapted to be permeated by aqueous alkaline processing composition. Preferably, the ratio of dye-providing compound to polymer will be about 0.25 to about 4.0. The present compounds may then be incorporated in a gelatin by techniques known in the art (e.g., a high boiling, water immiscible organic solvent or a low boiling or water miscible organic solvent).

A variety of silver halide developing agents can be employed in our invention. Any silver halide developing agent can be used as long as it cross-oxidizes with the image dye-providing compounds used herein. The developer can be employed in the photosensitive element to be activated by the alkaline processing compostion. Specific examples of developers which can be employed in our invention include hydroquinone, aminophenols, e.g., N-methylaminophenol, PHenidone (1-phenyl-3-pyrazolidone) trademark of Ilford, Ltd.; Dimezone (1-phenyl-4,4-dimethyl-3-pyrazolidone) trademark of Eastman Kodak Company; 1-phenyl-4-methyl-4-hydroxymethyl-3-pyrazolidone, N,N-diethyl-p-phenylenediamine, 3-methyl-N,N-diethyl-p-phenylenediamine, 3-methoxy-N,N-diethyl-p-phenylenediamine, etc. The black-and-white developers in this list are preferred, in that they have a reduced propensity of staining the dye image-receiving layer.

In a preferred embodiment of our invention, the silver halide developer in our process becomes oxidized upon development and reduces silver halide to silver metal. The oxidized developer then cross-oxidizes the sulfonamido-phenol or sulfonamido-naphthol dye-releasing compound. The product of cross-oxidation then undergoes alkaline hydrolysis, thus releasing an imagewise distribution of diffusible anionic dye which then diffuses to the receiving layer to provide the dye image. The diffusible moiety is transferable in alkaline processing composition either by virtue of its self-diffusivity or by having attached to it one or more solubilizing groups such as —COOH, —SO$_3$H, —SO$_2$NR$^5$R$^6$, OH, etc. (where R$^5$ and R$^6$ are as described previously with at least one being hydrogen).

In using the especially preferred dye-releasing compounds according to our invention, the production of diffusible dye images is a function of development of the silver halide emulsions with a silver halide developing agent to form either negative or direct positive silver images in the emulsion layers. If the silver halide emulsion employed forms a direct positive silver image, such as a direct positive internal-image emulsion or a solarizing emulsion, which develops in unexposed areas, a positive image can be obtained on the dye image-receiving layer. After exposure of the film unit, the alkaline processing composition permeates the various layers to initiate development in the unexposed photosensitive silver halide emulsion layers. The developing agent present in the film unit develops each of the silver halide emulsion layers in the unexposed areas (since the silver halide emulsions are direct-positive ones), thus causing the developing agent to become oxidized imagewise corresponding to the unexposed areas of the direct-positive silver halide emulsion layers. The oxidized developing agent then cross-oxidizes the dye-releasing compounds and the oxidized form of the compounds then undergoes a base-catalyzed reaction to release the preformed dyes imagewise as a function of the imagewise exposure of each of the silver halide emulsion layers. At least a portion of the imagewise distributions of diffusible dyes diffuse to the image-receiving layer to form a positive image of the original subject. After being contacted by the alkaline processing compostion, a pH-lowering layer in the film unit lowers the pH of the film unit (or the image-receiving unit) to stabilize the image.

Internal-image silver halide emulsions useful in those embodiments wherein a dye is released as function of oxidation are direct-positive emulsions that form latent images predominantly inside the silver halide grains, as distinguished from silver halide grains that form latent images predominantly on the surface thereof. Such internal-image emulsions are described by Davey et al in U.S. Pat. No. 2,592,250, issued Apr. 8, 1952, and elsewhere in the literature. Other useful emulsions are described in U.S. Pat. No. 3,761,276, dated Sept. 25, 1973. Internal-image silver halide emulsions can be defined in terms of the increased maximum density obtained when developed with internal-type developers over that obtained. when developed with surface-type developers. Suitable internal-image emulsions are those which, when measured according to normal photographic techniques by coating a test portion of the silver halide emulsion on a transparent support, exposing to a light-intensity scale having a fixed time between 0.01 and 1 second, and developing for 3 minutes at 20° C. in Developer A below internal-type developer), have a maximum density at least five times the maximum density obtained when an equally exposed silver haldide emulsion is developed for 4 minutes at 20° C. in Developer B described below surface-type developer). Preferably, the maximum density in Developer A is at least 0.5 density unit greater than the maximum density in Developer B.

| DEVELOPER A | |
|---|---|
| Hydroquinone | 15 g. |
| Monomethyl-p-aminophenol sulfate | 15 g. |
| Sodium sulfite (desiccated) | 50 g. |
| Potassium bromide | 10 g. |
| Sodium hydroxide | 25 g. |
| Sodium thiosulfate | 20 g. |
| Water to make one liter. | |
| DEVELOPER B | |
| P-hydroxyphenylglycine | 10 g. |
| Sodium carbonate | 100 g. |
| Water to make one liter. | |

The internal-image silver halide emulsions when processed in the presence of fogging or nucleating agents provide direct positive silver images. Such emulsions are particularly useful in the above described embodiment. Suitable fogging agents include the hydrazines disclosed in Ives U.S. Pat. Nos. 2,588,982 issued Mar. 11, 1952, and 2,563,785 issued Aug. 7, 1951; the hydrazides and hydrazones disclosed in Whitmore U.S. Pat. No. 3,227,552 issued Jan. 4, 1966; hydrazone quaternary salts described in Lincoln and Heseltine U.S. Pat. No. 3,615,615 issued Oct. 26, 1971; hydrazone containing polymethine dyes described in Spence and Janssen U.S. Pat. No. 3,718,470 issued Feb. 27, 1973; or mixtures thereof. The quantity of fogging agent employed can be widely varied depending upon the results desired. Generally, the concentration of fogging agent is from about 0.02 to about 8 grams per mole of silver in the photosensitive layer in the photosensitive element or from about 0.1 to about 2 grams per liter of developer if it is located in the developer. The fogging agents described in U.S. Pat. Nos. 3,615,615 and 3,718,470, however, are preferably used in concentrations of about 20 to 200 mg per mole of silver in the photosensitive layer.

The solarizing direct-positive silver halide emulsions useful in the above-described embodiment are well-known silver halide emulsions which have been effectively fogged either chemically, such as by the use of reducing agents, or by radiation to a point which corresponds approximately to the maximum density of the reversal curve as shown by Mees, *The Theory of the Photographic Process*, published by the Macmillan Co., New York, N.Y., 1942, pages 261–297. Typical methods for the preparation of solarizing emulsions are shown by Groves British Pat. No. 443,245, Feb. 25, 1936, who subjected emulsions to Roetgen rays "until an emulsion layer formed therefrom, when developed without preliminary exposure, is blackened up to the apex of its graduation curve38"; Szaz British Pat. No. 462,730, Mar. 15, 1937, the use of either light or chemicals such as silver nitrate, to convert ordinary silver halide emulsions to solarizing direct positive emulsions; and Arens U.S. Pat. No. 2,005,837, June 25, 1935, the use of silver nitrate and other compounds in conjunction with heat to effect solarization. Particularly useful are the fogged direct-positive emulsions of Berriman U.S. Pat. No. 3,367,778; Illingsworth U.S. Pat. Nos. 3,501,305, 3,501,306 and 3,501,307; and combinations thereof.

Other embodiments in which our imaging chemistry can be employed include the techniques described in U.S. Pat. Nos. 3,227,550, 3,227,551, 3,227,552 and 3,364,022.

Negative silver halide emulsions useful in certain embodiments of this invention, such as the above, can comprise, for example, silver chloride, silver bromide, silver chlorobromide, silver bromoiodide, silver chlorobromiodide or mixtures thereof. The emulsions can be coarse- or fine-grain and can be prepared by any of the well-known procedures, e.g., single-jet emulsions such as those described in Trivelli and Smith, *The Photographic Journal*, Vol. LXXIX, May, 1939 (pp. 330–338), double-jet emulsions, such as Lippmann emulsions, ammoniacal emulsions, thiocyanate or thioether ripened emulsions such as those described in Nietz et al U.S. Pat. No. 2,222,264 issued Nov. 19, 1940; Illingsworth U.S. Pat. No. 3,320,069 issued May 16, 1967; and Jones U.S. Pat. No. 3,574,628 issued Apr. 13, 1971. The emulsions may be monodispersed regular-grain emulsions such as the type described in Klein and Moisar, *J. Phot. Sci.*, Vol. 12, No. 5, Sept./Oct., 1964 (pp. 242–251).

Another embodiment of our invention uses the image-reversing technique disclosed in British Pat. No. 904,364, page 19, lines 1–41. In this system our dye-providing compounds are used in combination with physical development nuclei in a nuclei layer contiguous to the photosensitive silver halide negative emulsion layer. The film unit contains a silver halide solvent, preferably in a rupturable container with the alkaline processing composition.

The various silver halide emulsion layers of a color film assembly of the invention can be disposed in the usual order, i.e., the blue-sensitive silver halide emulsion layer first with respect to the exposure side, followed by the green-sensitive and red-sensitive silver halide emulsion layers. If desired, a yellow dye layer or a yellow colloidal silver layer can be present between the blue-sensitive and green-sensitive silver halide emulsion layer for absorbing or filtering blue radiation that may be transmitted through the blue-sensitive layer. If desired, the selectivity sensitized silver halide emulsion layers can be disposed in a different order, e.g., the blue-sensitive layer first with respect to the exposure side, followed by the red-sensitive and green-sensitive layers.

The rupturable container employed in this invention can be of the type disclosed in U.S. Pat. Nos. 2,543,181; 2,643,886; 2,653,732; 2,724,051; 3,056,492; 3,056,491 and 3,152,515. In general, such containers comprise a rectangular sheet of fluid- and air-impervious material folded longitudinally upon itself to form two walls which are sealed to one another along their longitudinal and end margins to form a cavity in which processing solution is contained.

In a color film unit according to this invention, each silver halide emulsion layer containing a dye image-providing material or having the dye image-providing material present in a contiguous layer may be separated from the other silver halide emulsion layers in the image-forming portion of the film unit by materials including gelatin, calcium alginate, or any of those disclosed in U.S. Pat. No. 3,384,483, polymeric materials such as polyvinylamides as disclosed in U.S. Pat. No. 3,421,892, or any of those disclosed in French Pat. No. 2,028,236 or U.S. Pat. Nos. 2,992,104; 3,043,692; 3,044,873; 3,061,428; 3,069,263; 3,069,264; 3,121,011; and 3,427,158.

Generally speaking, except where noted otherwise, the silver halide emulsion layers in the invention comprise photosensitive silver halide dispersed in gelatin and are about 0.6 to 6 microns in thickness; the dye image-providing materials are dispersed in an aqueous alkaline solution-permeable polymeric binder, such as gelatin, as a separate layer about 1 to 7 microns in thickness; and the alkaline solution-permeable polymeric interlayers, e.g., gelatin, are about 1 to 5 microns in thickness. Of course, these thicknesses are approximate only and can be modified according to the product desired.

Any material can be employed as the image-receiving layer in this invention as long as the desired function of mordanting or otherwise fixing the dye images will be obtained. The particular material chosen will, of course, depend upon the dye to be mordanted. If acid dyes are to be mordanted, the image-receiving layer can contain basic polymeric mordants such as polymers of amino guanidine derivatives of vinyl methyl ketone such as described in Minsk U.S. Pat. No. 2,882,156, issued Apr. 14, 1959, and basic polymeric mordants such as described in Cohen et al U.S. Pat. No. 3,625,694, issued Dec. 7, 1971; U.S. Pat. No. 3,709,690, issued Jan. 9, 1973; and U.S. Pat. No. 3,898,088, issued Aug. 5, 1975. See also U.S. Pat. No. 3,859,096, issued Jan. 7, 1975.

Preferred mordants are cationic mordants such as polymeric compounds composed of a polymer having quaternary nitrogen groups and at least two aromatic nuclei for each quaternary nitrogen in the polymer cation (i.e., having at least two aromatic nuclei for each positively charged nitrogen atom), such polymeric compounds being substantially free of carboxy groups. Useful mordants of this type are comprised of units of the following formula in copolymerized relationship with units of at least one other ethylenically unsaturated monomer:

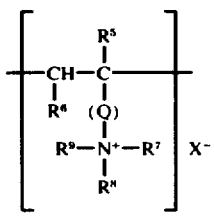

wherein $R^5$ and $R^6$ each represent a hydrogen atom or a lower alkyl radical (or 1 to about 6 caron atoms) and $R^6$ can additionally be a group containing at least one aromatic nucleus (e.g., phenyl, naphthyl, tolyl); Q can be a divalent alkylene radical (or 1 to about 6 carbon atoms), a divalent arylene radical, a divalent aralkylene radical, a divalent arylenealkylene radical, such as

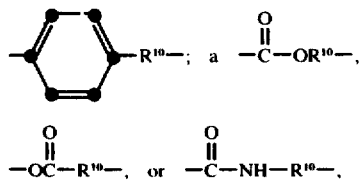

wherein $R^{10}$ is an alkylene radical, or $R^6$ can be taken together with Q to form a

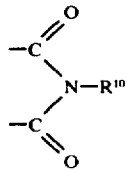

group; $R^7$, $R^8$ and $R^9$ can be alkyl, aralkyl or aryl, or $R^7$ and $R^8$ and the nitrogen atom to which they are attached can together with Q represent the atoms and bonds necessary to form a quaternized nitrogen-containing heterocyclic ring, and $X^-$ is a monovalent negative salt-forming radical or atom in ionic relationship with the positive salt-forming radical, wherein said polymer is substantially free of carboxy groups and wherein the positive salt forming radical of said polymer comprises at least two aryl groups for each quaternary nitrogen atom in said polymer. In one preferred embodiment, Q represents a phenylene or substituted phenylene radical and $R^7$, $R^8$ and $R^9$ are the same or different and represent alkyl groups, the sum of their carbon atoms exceeding 12. These preferred polymeric cationic mordants are described further in the above-mentioned U.S. Pat. No. 3,709,690 and U.S. application Ser. No. 400,778, incorporated herein by reference.

Another group of preferred mordants are those described in U.S. Pat. No. 3,958,995, issued May 25, 1976.

Other mordants useful in our invention include poly-4-vinylpyridine, the 2-vinyl pyridine polymer methyl-p-toluene sulfonate and similar compounds described in Sprague et al U.S. Pat. No. 2,484,430, issued Oct. 11, 1949, and cetyl trimethylammonium bromide, etc. Effective mordanting compositions are also described in Whitmore U.S. Pat. No. 3,271,148 and Bush U.S. Pat. No. 3,271,147, both issued Sept. 6, 1966.

Generally, good results are obtained when the image-receiving layer, preferably alkaline solution-permeable, is transparent and about 0.04 to about 0.40 mil in thickness. This thickness, of course, can be modified depending upon the result desired. The image-receiving layer can also contain ultraviolet absorbing materials to protect the mordanted dye images from fading due to ultraviolet light, brightening agents such as the stilbenes, coumarins, triazines, oxazoles, dye stabilizers such as the chromanols, alkylphenols, etc.

Use of a pH-lowering material in the dye image-receiving element of a film unit according to the invention will usually increase the stability of the transferred image. Generally, the pH-lowering material will effect a reduction in the pH of th image layer from about 13 to 14 to at least 11 and preferably 4–8 within a short time after imbibition. For example, polymeric acids as disclosed in U.S. Pat. No. 3,362,819, or solid acids or metallic salts, e.g., zinc acetate, zinc sulfate, magnesium acetate, etc., as disclosed in U.S. Pat. No. 2,584,030 may be employed with good results. Such pH-lowering materials reduce the pH of the film unit after development to terminate development and substantially reduce futher dye transfer and thus stabilize the dye image.

An inert timing or spacer layer can be employed in the practice of our invention over the pH-lowering layer which times or controls the pH reduction as a function of the rate at which alkali diffuses through the inert spacer layer. Examples of such timing layers include gelatin, polyvinyl alcohol or any of those disclosed in U.S. Pat. No. 3,455,686. The timing layer may be effective in evening out the various reaction rates over a wide range of temperatures, e.g., premature pH reduction is prevented when imbibition is effected at temperatures above room temperature, for example, at 95°–100° F. The timing layer is usually about 0.07 to about 0.7 mil in thickness. Especially good results are obtained when the timing layer comprises a hydrolyzable polymer or a mixture of such polymers which are slowly hydrolyzed by the processing composition. Examples of such hydrolyzable polymers include polyvinyl acetate, polyamides, cellulose esters, etc.

The alkaline processing composition employed in this invention is the conventional aqueous solution of an alkaline material, e.g., sodium hydroxide, sodium cabonate or an amine such as diethylamine, preferably possessing a pH in excess of 11, and preferably containing a developing agnt as described previously. The solution also preferably contains a viscosity-increasing compound such as a high-molecular-weight polymer, e.g., a water-soluble ether inert to alkaline solutions such as hydroxyethyl cellulose or alkali metal salts of carboxymethyl cellulose such as sodium carboxymethyl cellulose. A concentration of viscosity-increasing compound of about 1 to about 5% by weight of the processing composition is preferred which will impart thereto a viscosity of about 100 cp. to about 200,000 cp. In certain embodiments of our invention, an opacifying agent, e.g., $TiO_2$, carbon black, pH indicator dyes, etc., may be added to the processing composition.

While the alkaline processing composition used in this invention can be employed in a rupturable container, as described previously, to conveniently facilitate the introduction of processing composition into the film unit, other methods of inserting processing composition into the film unit could also be employed, e.g., interjecting processing solution with communicating members similar to hypodermic syringes which are attached either to a camera or camera cartridge.

The alkaline solution-permeable, substantially opaque, light-reflective layer employed in certain embodiments of photographic film units of our invention can generally comprise any opacifier dispersed in a binder as long as it has the desired properties. Particularly desirable are white light-reflective layers since they would be esthetically pleasing backgrounds on which to view a transferred dye image and would also possess the optical properties desired for reflection of incident radiation. Suitable opacifying agents include titanium dioxide, barium sulfate, zinc oxide, barium stearate, silver flake, silicates, alumina, zirconium oxide, zirconium acetyl acetate, sodium zirconium sulfate, kaolin, mica, or mixtures thereof in widely varying amounts depending upon the degree of opacity desired. The opacifying agents may be dispersed in any binder such as an alkaline solution-permeable polymeric matrix such as, for example, gelatin, polyvinyl alcohol, and the like. Brightening agents such as the stilbenes, coumarins, triazines and oxazoles can also be added to the light-reflective layer, if desired. When it is desired to increase the opacifying capacity of the light-reflective layer, dark-colored opacifying agents, e.g., carbon black, nigrosine dyes, etc., may be added to it, or coated in a separate layer adjacent to the light-reflective layer.

The supports for the photographic elements of this invention can be any material as long as it does not delecteriously effect the photographic properties of the film unit and is dimensionally stable. Typical flexible sheet materials include cellulose nitrate film, cellulose acetate film, poly(vinyl acetal) film, polystyrene film, poly(ethyleneterephthalate) film, polycarbonate film, polycarbonate film, poly-α-olefins such as polyethylene and polypropylene film, and related films or resinous materials. The support can be from about 2 to about 9 mils in thickness.

The silver halide emulsions useful in our invention are well known to those skilled in the art and are described in *Product Licensing Index*, vol. 92, Dec., 1971, publication 9232, p. 107, paragraph I, "Emulsion types"; they may be chemically and spectrally sensitized as described on page 107, paragraph III, "Chemical sensitization", and pp. 108–109, paragraph XV, "Spectral sensitization", of the above article; they can be protected against the production of fog and can be stabilized against loss of sensitivity during keeping by employing the materials described on p. 107, paragraph V, "Antifoggants and stabilizers", of the above article; they can contain development modifiers, hardeners, and coating aids as described on pp. 107–108, paragraph IV, "Development modifiers"; paragraph VII, "Hardeners"; and paragraph XII, "Coating aids", of the above article; they and other layers in the photographic elements used in this invention can contain plasticizers, vehicles and filter dyes described on p. 108, paragraph XI, "Plasticizers and lubricants", and paragraph VIII, "Vehicles", and p. 109, paragraph XVI, "Absorbing and filter dyes", of the above article; they and other layers in the photographic elements used in this invention may contain addenda which are incorporated by using the procedures described on p. 109, paragraph XVII, "Methods of addition", of the above article; and they can be coated by using the various techniques described on p. 109, paragraph XVIII, "Coating procedures", of the above article, the disclosures of which are hereby incorporated by reference.

It will be appreciated that there remains in the photographic element after transfer has taken place an imagewise distribution of dye in addition to developed silver. A color image comprising residual nondiffusible compound may be obtained in this element if the residual silver and silver halide are removed by any conventional manner well known to those skilled in the photographic art, such as a bleach bath followed by a fix bath, a bleach-fix bath, etc. The imagewise distribution of dye may also diffuse out of the element into these baths, if desired, rather than to an image-receiving element. If a negative-working silver halide emulsion is employed in such photosensitive element, then a positive color image, such as a color transparency or motion-picture film, may be produced in this manner. If a direct-positive silver halide emulsion is employed in such photosensitive element, then a negative color image may be produced.

The following examples are provided for a further understanding of the invention. The structures of all of the compounds were confirmed by their infrared and NMR spectra and in some cases by elemental analysis. The notation —$C_5H_{11}$—t as used herein is an abbreviation for t-pentyl.

4-Amino-N-[4-(2,4-di-t-pentylphenoxy)-butyl]-1-hydroxy-2-naphthamide may be prepared as follows: 1-hydroxy-N-[4-(2,4-di-t-pentylphenoxy)-butyl]-2-napthamide (U.S. Pat. No. 2,474,293) is coupled with a diazotized p-anisidine

The azo group of the compound thus prepared may then be reduced with sodium dithionite ($Na_2S_2O_4$) to the corresponding amine (see also U.S. Pat. No. 3,458,315, column 10).

EXAMPLE 1 - Preparation of DRR Compound A

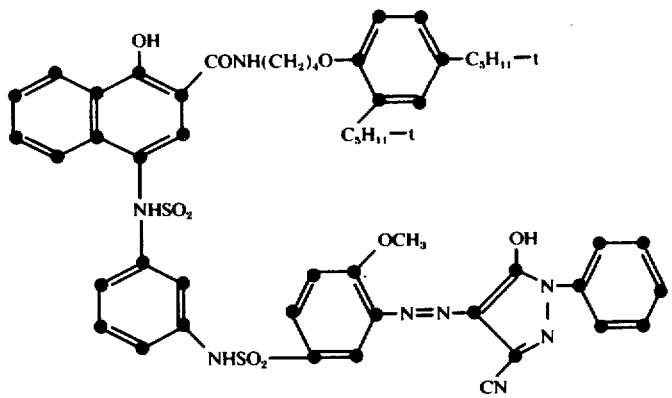

To a solution of 12.9 g. (20 mmol) of 4-(3-aminobenzenesulfonamido)-N-[4-(2,4-di-tert-pentylphenoxy)butyl]-1-hydroxy-2-naphthamide in 150 ml of dry pyridine at 0° C, under nitrogen, is added 8.4 g (20 mmol) of 4-(5-chlorosulfonyl-2-methoxyphenylazo)-3-cyano-1-phenyl-2-pyrazolin-5-one. The solution is stirred at 0° C for 45 minutes, and then filtered to remove a solid residue. The filtrate is poured onto 200 ml of ice and 200 ml of concentrated hydrochloric acid; the solid is then collected on a filter funnel, washed well with water and dried to yield 21.6 g (>100%). The crude solid is recrystallized from 100 ml of acetic acid. The solid is collected on a filter funnel and then slurried in 1500 ml of hexane. It is again collected on a filter funnel and dried to yield 17.9 g (87%); m.p. 187°-190° C dec.

Preparation of Intermediates

The 4-(3-aminobenzenesulfonamido-N-[4-(2,4-di-t-pentylphenoxy)butyl]-1-hydroxy-2-naphthamide is prepared conventionally by catalytic reduction of the corresponding nitro compound which in turn is synthesized by the reaction of m-nitrobenzenesulfonyl chloride on 4-amino-N-[4-(2,4-di-t-pentylphenoxy)butyl]-1-hydroxy-2-naphthamide (U.S. Pat. No. 3,458,315).

The 4-(5-chlorosulfonyl-2-methoxyphenylazo)-3-cyano-1-phenyl-2-pyrazolin-5-one is prepared by adding 11.0 ml of phosphoryl chloride in 50 ml of dimethylformamide below 25° to a slurry of 11.0 g (25 mmol) of 3-carbamoyl-4-(2-methoxy-5-sulfophenylazo)-1-phenyl-2-pyrazolin-5-one, sodium salt in 30 ml of N,N-dimethylformamide (DMF). The mixture is stirred for one hour at room temperature and the solid collected on a filter funnel. The damp solid is slurried in 75 ml of hexane, collected on a filter funnel, and dried in a vacuum oven to yield 9.65 g (92%) of the sulfonyl chloride. The phosphoryl chloride/DMF treatment dehydrates the carboxamido group as well as converting the sulfonic acid to the sulfonyl chloride.

The 3-carbamoyl-4-(2-methoxy-5-sulfophenylazo)-1-phenyl-2-pyrazolin-5-one is prepared by first diazotizing 10.2 g (50 mmol) of 3-amino-4-methoxybenzene sulfonic acid with 3.5 g (50 mmol) of sodium nitrite in 30 ml of a 10% sodium hydroxide solution by adding the solution dropwise to 60 ml of 10% hydrochloric acid at 0° C. The diazonium salt solution was then added to a solution of 10.2 g (50 mmol) of 3-carbamoyl-1-phenyl-2-pyrazolin-5-one (Weissburger and Porter J. Am. Chem. Soc. 64, 2133 (1942) and 25 g of sodium acetate in 200 ml of water containing 15 ml of 10% sodium hydroxide below 5° C. The mixture is stirred for 30 minutes and acidified with concentrated hydrochloric acid. The mixture is heated to 85° C. More concentrated hydrochloric acid is added at 60° C causing an increase in crystal size to make filtration possible. The mixture is cooled to 30° C; the solid was collected on a filter funnel, washed with water and dried to yield 18.7 g (85%) of the azo dye.

EXAMPLE 2 - Preparation of DRR Compound B

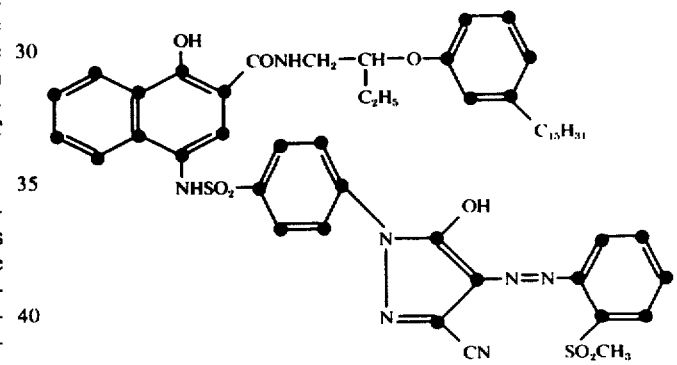

This dye-releasing redox compound is prepared by the reaction of the azopyrazolone Compound II and the aminonaphthyl Compound I, both of which are identified below. Compound II (37.3 g, 0.080 mole) is added over about 25 minutes to a solution of Compound I (46.1 g, 0.084 mole) in 600 ml of dichloromethane at room temperature in a nitrogen atmosphere. A solution of 7.9 g (0.10 mole) pyridine in 80 ml dichloromethane is added over 30 minutes and the mixture is stirred for 3 hours. The mixture is evaporated to dryness without heating, then dissolved in 250 ml warm (50° C) dimethylformamide. The solution is filtered from some insoluble material and the filtrate poured with stirring into 1200 ml hot methanol. The mixture is cooled and the solid collected by filtration. This purification is repeated and the resulting solid slurried with 600 ml ether for one hour, then filtered off and dried yielding 61.5 g (78%) of product, m.p. 194°-197° C (λmax = 428 nm, ε = 2.4 · 10⁴ in dimethylacetamide).

Compound I - 4-Amino-1-hydroxy-N-[2-(3-n-pentadecylphenoxy)butyl]-2-naphthamide. This compound is prepared from the naphtholic coupler, 1-hydroxy-N-[2-(3-n-pentadecylphenoxy)butyl]-2-naphthamide, by a two step process involving (1) azo coupling and (2) reduction with sodium dithionite (Na₂S-

$_2O_4$) as described in U.S. Pat. No. 3,458,315, column 10. The above naphtholic coupler is prepared by a method analogous to those described in U.S. Pat. No. 2,474,293.

Compound II - 1-p-Chlorosulfonylphenyl-3-cyano-4-(o-methylsulfonyl)phenylazo-2-pyrazolin-5-one. This dye derivative is prepared as in Example 1 from 3-carbamoyl-4-(o-methylsulfonyl)phenylazo-1-p-sulfophenyl-2-pyrazolin-5-one by reaction of phosphorus oxychloride in dimethylformamide in 51% yield.

3-carbamoyl-4-(o-methylsulfonyl)phenylazo-1-p-sulfophenyl-2-pyrazolin-5-one is prepared as in Example 1 by diazotization of o-methylsulfonylaniline and coupling with 3-carbamoyl-1-p-sulfophenyl-2-pyrazolin-5-one in approximately quantitative yield and is subsequently used without further purification.

EXAMPLE 3

Table I lists examples of the dye-releasing redox (DRR) compounds of this invention. Data pertaining to these compounds are shown in Table II. In general, the dyes and DRR compounds of the invention are prepared by known methods as exemplified above. The diazotization and coupling reactions used in making the dyes are carried out essentially as described in Fierz-David and Blangley, *Process of Dye Chemistry*, translated from the 5th Austrian Edition by P. W. Vittum, N.Y., Interscience Publishers, Inc., 1949.

Table II shows the absorption, diffusion, and light stability data for the released dyes corresponding to the DRR compounds of Table I. The hue of the dye is represented by the maximum wavelength (λmax) of the absorption spectrum and the half-band-width (½ B.W.) which is the width of the spectrum band at one-half of the density of the peak at λmax. The spectra and light stability tests are measured on a dyed film strip containing a mixture of gelatin and poly(styrene-co-N-vinylbenzyl-N,N,N-trihexylammonium chloride), which is coated at 2.2 g/m² of each component on a polyester support. The dyes are first dissolved in 0.1N sodium hydroxide (a few drops of dimethylformamide are needed in some cases). A strip of undyed mordant is immersed in the dye solution until the dye is absorbed by the mordant to a density of approximately 1.5 to 2.0. The strip is then placed in a Harleco standard aqueous buffer solution of the pH indicated in the table, equilibrated for 1 minute, and dried. The light stability is determined by exposure to a "simulated average northern skylight" (SANS) test for 7 days: a high intensity 6000 w xenon arc lamp (ANSI specification pH 1.42-1969) unit irradiating the sample with 5380 lux at 21° C and 45% relative humidity. The optical density is measured at λmax both before ($D_o$) and after (D) exposure. These values and the percentage loss are given in Table II.

The diffusivity of the dyes is measured as follows: The dye (1.5 × 10⁻⁴ mole) is dissolved in 30 ml of a solution 0.5N in sodium hydroxide and containing 30 g/l. hydroxyethyl cellulose. The solution is spread between a polyester film cover sheet and a receiving element by passing the transfer sandwich between a pair of juxtaposed pressure rollers set so that the alkaline dye composition is 0.07mm thick. The receiving element comprised in order on a cellulose acetate support four layers: (a) a layer containing (a mixture of poly(styrene-co-N-vinylbenzyl-N,N,N-trihexylammonium chloride) mordant and gelatin (2.2 g/m² each); (b) a layer containing titanium dioxide and gelatin (2.5 and 2.2 g/m², respectively); (c) a layer of carbon black and gelatin (2.7 and 1.7 g/m², respectively); and (d) a gelatin layer (4.3 mg/dm²). The dye density of the mordant layer is measured by a reflection densitometer through the base at time intervals of 30, 60 and 120 seconds after spreading the alkaline dye composition. The three figures given in the table are percentages of the densities read at these intervals in relation to the eventual maximum density (Dmax). Most of the dyes measured show at least 60% diffusion after 60 seconds and 80% after 120 seconds.

TABLE I

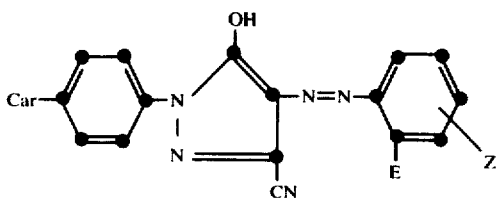

| Car* | X | R | J | q | m | E | M |
|---|---|---|---|---|---|---|---|
| 1 | A | — | — | — | 0 | —OCH₃ | H |
| 2 | A | m-C₆H₄— | H | —SO₂— | 1 | 1 | —OCH₃ | H |
| 3 | A | —(CH₂)₃— | H | —SO₂— | 1 | 1 | —OCH₃ | H |
| 4 | A | — | — | — | 0 | —Cl | H |
| 5 | B | m-C₆H₄— | H | —SO₂— | 1 | 1 | —OCH₃ | H |
| 6 | C | — | — | — | 0 | —Cl | H |
| 7 | B | — | — | — | 0 | —Cl | H |
| 8 | D | — | — | — | 0 | —Cl | H |
| 9 | A | m-C₆H₄— | H | —SO₂— | 1 | 1 | —OCH₃ | 2,4,6-Cl₃ |
| 10 | D | m-C₆H₄— | H | —SO₂— | 1 | 1 | —OCH₃ | H |

TABLE I-continued

| | Car | Z | E |
|---|---|---|---|
| 11 | A | SO$_2$CH$_3$ | H |
| 12 | D | SO$_2$CH$_3$ | H |

A =

[Structure: 1-hydroxy-4-(NHSO$_2$—)naphthalene-2-CONH(CH$_2$)$_4$O—phenyl with C$_5$H$_{11}$-t groups]

B =

[Structure: 1-hydroxy-4-(NHSO$_2$—)naphthalene-2-CONH(CH$_2$)$_4$O—phenyl with C$_{15}$H$_{31}$]

C =

[Structure: 1-hydroxy-4-(NHSO$_2$—)naphthalene-2-CONH—CH$_2$—CH(Et)O—phenyl with two C$_5$H$_{11}$-t groups]

D =

[Structure: 1-hydroxy-4-(NHSO$_2$—)naphthalene-2-COHN—CH$_2$CH(C$_2$H$_5$)—O—phenyl with C$_{15}$H$_{31}$-n]

*Car Identification

TABLE II

| | | Released Dyes Corresponding to DRR Compounds of Table I | | | | | | | |
|---|---|---|---|---|---|---|---|---|---|
| | | Absorption MO-569 | | Diffusivity | | | | | |
| | | λmax | ½BW | (Sec. % of Find) | | | Light Stability | | % |
| Compound | pH | (nm) | (nm) | 30 | 60 | 120 | pH | D$_o$ D | Remaining |
| 1 | 4 | 444 | 120 | 52 | 76 | 95 | — | — — | — |
| 2 | 4 | 443 | 120 | 40 | 60 | 82 | 4 | 0.91 0.47 | 52 |
| 3 | 4 | 444 | 120 | 44 | 67 | 88 | 4 | 1.49 0.80 | 54 |
| 4 | 4 | 461 | 104 | 41 | 66 | 86 | 5 | 1.21 1.11 | 92 |
| 5 | 4 | 443 | 120 | 40 | 60 | 82 | 4 | 0.91 0.47 | 52 |
| 6 | 4 | 461 | 104 | 41 | 66 | 86 | 5 | 1.21 1.11 | 92 |
| 7 | 4 | 461 | 104 | 41 | 66 | 86 | 5 | 1.21 1.11 | 92 |
| 8 | 4 | 461 | 104 | 41 | 66 | 86 | 5 | 1.21 1.11 | 92 |
| 9 | 4 | 448 | 110 | 32 | 55 | 77 | — | — — | — |
| 10 | 4 | 443 | 120 | 40 | 60 | 82 | 4 | 0.91 0.47 | 52 |
| 11 | 5 | 434 | 104 | 45 | 71 | 91 | 5 | 1.42 1.33 | 94 |
| 12 | 5 | 434 | 104 | 45 | 71 | 91 | 5 | 1.42 1.33 | 94 |

EXAMPLE 4

Table III indicates the structure of additional dyes which are capable of release from the DRR compounds of the invention. Their identification symbols correspond to Formula II, page 4. The absorption spectra on the mordanted strip is obtained as shown in Example 3.

TABLE III

Released Dyes

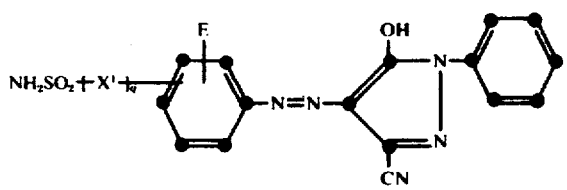

| Compound | q | X | F | Link* | pH | Absorption λmax(nm) | ½ BW(nm) |
|---|---|---|---|---|---|---|---|
| 13 | 1 | —CH$_2$— | H | 4- | 4 | 428 | 117 |
| 14 | 0 | — | H | 4- | 5 | 455 | 110 |
| 15 | 0 | — | H | 3- | 5 | 448 | 114 |

*Position of attachment of —SO$_2$NH$_2$ containing linking group to arylazo moiety.

EXAMPLE 5

An integral multicolor photographic Element I of the invention is prepared by coating the following layers in the order given on a poly(ethylene terephthalate) film support (coverages in parentheses in g/m² unless indicated otherwise):

1. image-receiving layer of poly(styrene-co-N-vinylbenzyl-N,N,N-trihexylammonium chloride) (2.2) and gelatin (2.2)
2. reflecting layer of titanium dioxide (21.5) and gelatin (2.2)
3. opaque layer of carbon black (2.7) and gelatin (1.7)
4. Compound A (0.54) dispersed in gelatin (0.73)
5. red-sensitive, direct positive, internal image gelatin-silver bromide emulsion (1.1 Ag, 1.1 gelatin); 5-sec-octadecylhydroquinone-2-sulfonic acid (8.0 g/mole silver) and fogging agent Compound E (1.5 g/mole silver)
6. interlayer of gelatin (0.54) and 2,5-di-sec-dodecylhydroquinone (1.1)
7. Compound B (0.65) dispersed in gelatin (1.05)
8. green-sensitive, direct positive, internal image gelatin-silver bromide emulsion (1.1 silver, 1.16 gelatin); 5-sec-octadecylhydroquinone-2-sulfonic acid (16.0 g/mole silver); and fogging agent Compound E (1.5 g/mole silver)
9. interlayer of gelatin (0.54) and 2,5-di-sec-dodecylhydroquinone (1.1)
10. Compound C (1.1) and gelatin (1.1)
11. blue-sensitive, direct positive, internal image gelatin-silver bromide emulsion (1.1 silver, 1.1 gelatin); 5-sec-octadecylhydroquinone-2-sulfonic acid (8.0 g/mole silver); and fogging agent Compound E (1.5 g/mole silver)
12. overcoat layer of gelatin (0.54) and hardener bis(vinylsulfonylmethyl)ether (57.0 mg/m²).

A second multicolor control Element II was the same as the above except it contained prior art Compound D (Compound XLI of Fleckenstein et al. U.S. Ser. No. 351,673) instead of Compound C in layer 10.

The above silver halide emulsions were direct positive emulsions having high internal sensitivity and low surface sensitivity of the type described in U.S. Pat. No. 3,761,276.

The above-prepared photosensitive element was then exposed to a graduated desity multicolor test object. The following processing composition was employed in a pod and was spread between the photosensitive element and the transparent cover sheet described below at about 22° C by passing the transfer sandwich between a pair of juxtaposed rollers so that the liquid layer is about 7.5 μm.

The cover sheet was prepared by coating the following layers on a poly(ethylene terephthalate) support:

1. a polyacrylic acid layer (15.5)
2. a timing layer of a 95/5 mixture of cellulose acetate (40% acetyl) and poly(styrene-co-maleic anhydride) (3.2).

The processing composition was:

| | |
|---|---|
| Potassium hydroxide | 56.0 g |
| 4-Hydroxymethyl-4-methyl-1-phenyl-3-pyrazolidone | 8.0 g |
| 5-Methylbenzotriazole | 2.4 g |
| t-Butylhydroquinone | 0.2 g |
| Sodium sulfite (anhyd.) | 2.0 g |
| Carbon | 40.0 g |
| Hydroxyethylcellulose | 25.0 g |
| Water to make | 1.0 l. |

After three hours the sensitometric results were read by reflection densitometry on the image-receiving layer through the support.

| Multilayer Coating | Yellow DRR Compound | Blue Dmax | Blue Dmin |
|---|---|---|---|
| I | C | 2.22 | 0.28 |
| II | D | 1.62 | 0.32 |

The DRR Compound D loses substantial Dmax over the three hours that the pH in the transfer sandwich reaches its equilibrium value. The protonation of D shifts the hue to shorter wavelength, giving the effect of lower density to blue light. Protonation of C has little effect on the hue. Both released dyes have pK$_a$ values of about 5.5 when measured in methanol-water solution.

Compound Identification

A =
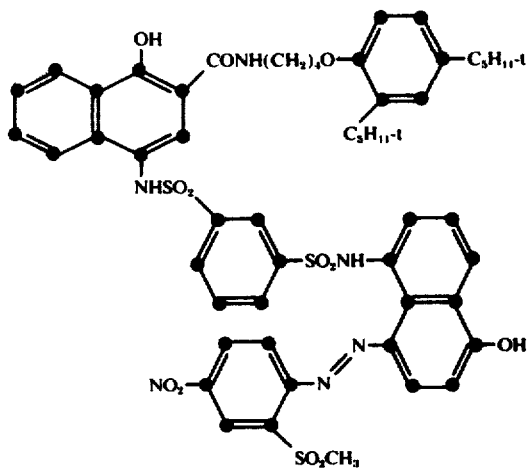
Cpd. XLV of U.S. Appln. SN 351,673
B =
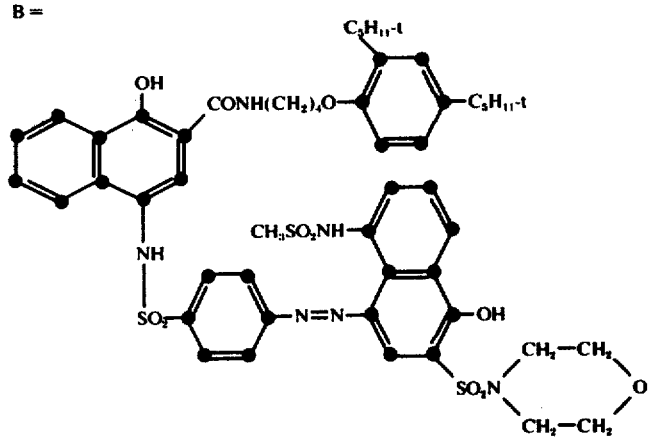
Cpd. 9, Table I of U.S. Pat. No. 3,932,380, issued Jan. 13, 1976
C = DRR Compound of Example 1
D =
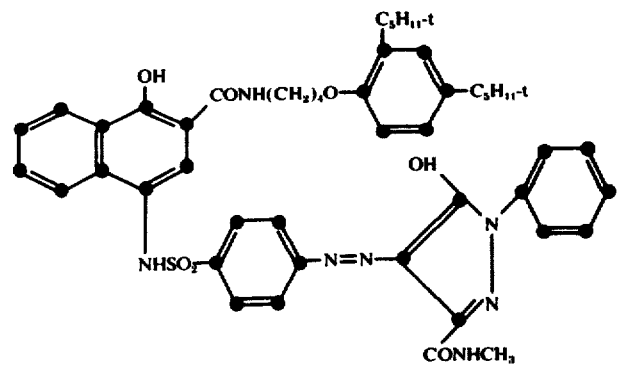
Cpd. XLI of U.S. Appln. Ser. No. 351,673
E - 1-Acetyl-2- 4-[5-amino-2-(2,4-di-t-pentylphenoxy)benzamido]-phenyl hydrazine
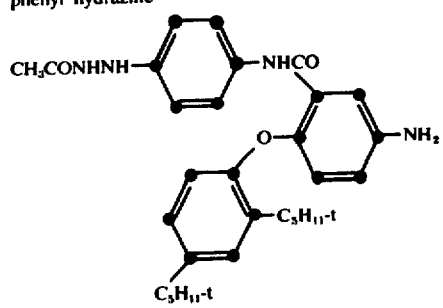
Ballasted analogue of the 1-formyl-2-phenyl-hydrazine of Whitmore, U.S. Pat. No. 3,227,552.

Although the invention has been described in considerable detail with particular reference to certain preferred embodiments thereof, variations and modifications can be effected within the spirit and scope of the invention.

We claim:

1. A yellow image dye-releasing compound having a formula as follows

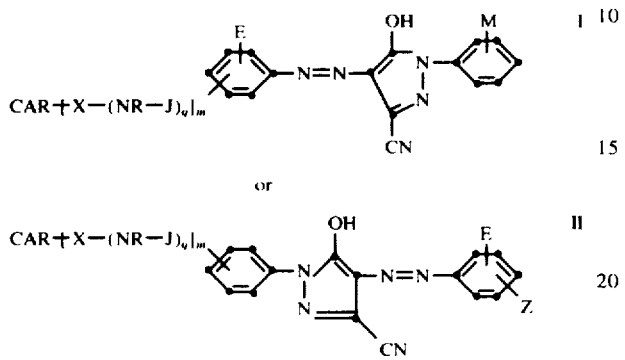

wherein
CAR represents a ballasted o- or p-sulfonamidophenol or o- or p-sulfonamidonaphthol carrier moiety which, as a function of oxidation under alkaline conditons, releases a diffusible dye from said compound;

X represents a bivalent linking group of the formula $-R^1-L_n-R^1_p-$ where each $R^1$ can be the same or different and each represents alkylene having 1 to about 8 carbon atoms; phenylene; or, phenylene substituted with carboxy, chloro, methyl or methoxy; L represents a bivalent radical selected from oxy, carbonyl, carboxamido, carbamoyl, sulfonamido, sulfamoyl, sulfinyl or sulfonyl; n is an integer having a value of 0 or 1; p is 1 when n equals 1 and p is 1 or 0 when n equals 0, provided that when p is 1 the carbon content of the sum of both R radicals does not exceed 14 carbon atoms;

R represents hydrogen or alkyl having 1 to about 6 carbon atoms;

J represents a bivalent radical selected from sulfonyl or carbonyl;

m and q each represent an integer having a value of 0 or 1;

E represents hydrogen, chloro, bromo, fluoro, alkyl having 1 to about 4 carbon atoms or alkoxy having 1 to about 4 carbon atoms;

Z represents hydrogen or an electron withdrawing group selected from cyano, trifluoromethyl, alkylsulfonyl having 1 to about 8 carbon atoms, alkylsulfonyl having 1 to about 8 carbon atoms substituted with hydroxy, phenyl, cyano, sulfamoyl, carboxy, fluorosulfonyl or sulfo; phenylsulfonyl or phenylsulfonyl substituted with carboxy, hydroxy, sulfamoyl, fluorosulfonyl, carboxy or sulfo; a carboxylic acid ester having the formula $-COOR^2$ wherein $R^2$ is alkyl having 1 to about 18 carbon atoms, phenyl or phenyl substituted with chloro or nitro; sulfo, a sulfamoyl radical having the formula $-SO_2NR^3R^4$ wherein $R^3$ represents hydrogen or alkyl having 1 to about 6 carbon atoms and $R^4$ represents hydrogen, alkyl having 1 to about 6 carbon atoms, alkyl having 1 to about 6 carbon atoms substituted with hydroxy, cyano, fluorosulfonyl, carboxy or sulfo; benzyl, phenyl, phenyl substituted with hydroxy, sulfonyl, sulfamoyl, carboxy or sulfo; alkylcarbonyl having 1 to about 8 carbon atoms, or phenylcarbonyl having 6 to about 9 carbon atoms, with the proviso that the carbon content of the sum of $R^3$ and $R^4$ not exceed 14 carbon atoms; a carbamoyl radical having the formula $-CON(R^3)_2$ wherein each $R^3$ can be the same or different and is as described previously; and M represents hydrogen, a solubilizing group or precursor thereof selected from carboxy, sulfo, a sulfamoyl radical as described for Z or a carboxylic acid ester as described for Z.

2. A compound as described in claim 1 wherein CAR represents a carrier moiety which, as a function of oxidation under alkaline conditions, releases a diffusible dye from said compound and having the formula

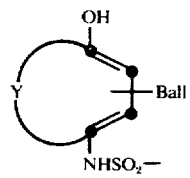

wherein Ball represents an organic ballasting group containing at least 8 carbon atoms which renders said compound nondiffusible in said photographic element during development in an alkaline processing composition;

Y represents the carbon atoms necessary to complete a benzene or naphthalene nucleus;

$R^1$ represents alkylene having 1 to about 4 carbon atoms, phenylene or phenylene substituted with carboxy, chloro, methyl or methoxy;

L represents sulfamoyl, sulfonamido, carbamoyl or carboxamido;

R represents hydrogen;

q is an integer having a value of 1;

m is an integer having a value of 1 or 0;

E represents hydrogen, chloro, methoxy, ethoxy, propoxy or isopropoxy;

Z represents cyano, alkylsulfonyl having 1 to about 6 carbon atoms, alkylsulfonyl having 1 to about 6 carbon atoms substituted with hydroxy, phenyl, cyano, sulfamoyl, carboxy, fluorosulfonyl or sulfo; phenylsulfonyl; phenylsulfonyl substituted with hydroxy, sulfamoyl, fluorosulfonyl, carboxy or sulfo; a sulfamoyl radical having the formula $-SO_2NHR^4$ wherein $R^6$ is hydrogen, alkyl having 1 to about 4 carbon atoms, phenyl; or a carbamoyl radical having the formula $-CON(R^3)_2$ wherein $R^3$ is hydrogen or methyl; and M represents hydrogen, a carboxylic acid ester having the formula $-COOR^2$ wherein $R^2$ is alkyl having 1 to about 4 carbon atoms, phenyl; or a sulfamoyl radical having the formula $-SO_2NHR^4$ wherein $R^4$ is hydrogen, alkyl having 1 to about 4 carbon atoms or phenyl.

3. A compound according to claim 2 wherein $Car[X-(NR-J)_q]_m$ is in the meta position relative to the azo linkage in Formula I, and in the para position relative to the pyrazolone nitrogen in Formula II.

4. A compound according to claim 3 wherein m is 0.

5. A compound according to claim 4 wherein

Y represents the atoms necessary to complete a naphthalene nucleus;

Z represents alkylsulfonyl having 1 to about 8 carbon atoms, cyano, or a sulfamoyl radical having the formula $-SO_2NHR^4$ wherein $R^4$ is alkyl having 1 to about 4 carbon atoms; and M is hydrogen.

6. A compound according to claim 5 wherein —Ball is linked to the sulfonamidonaphthol nucleus through a bivalent —CONH— or —SO$_2$NH— moiety.

7. A compound according to claim 5 wherein —Ball represents

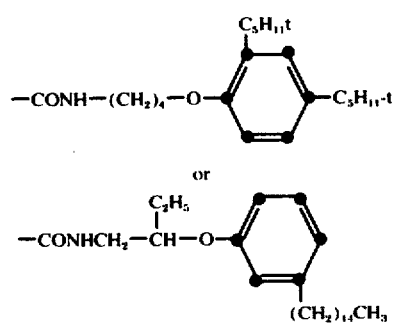

and is in the 2-position relative to the hydroxy group.

8. A compound according to claim 7 wherein E represents hydrogen, chloro or methoxy; and Z represents $-SO_2CH_3$.

9. A yellow image dye-releasing compound having the formula

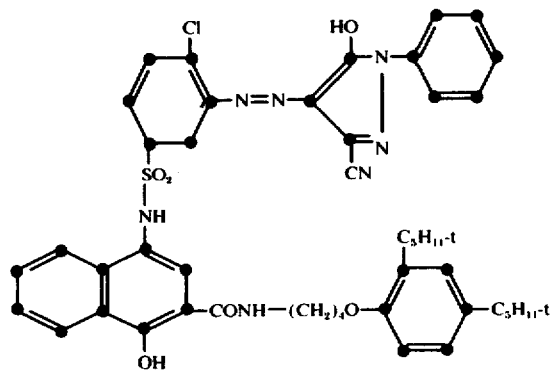

10. A yellow image dye-releasing compound having the formula

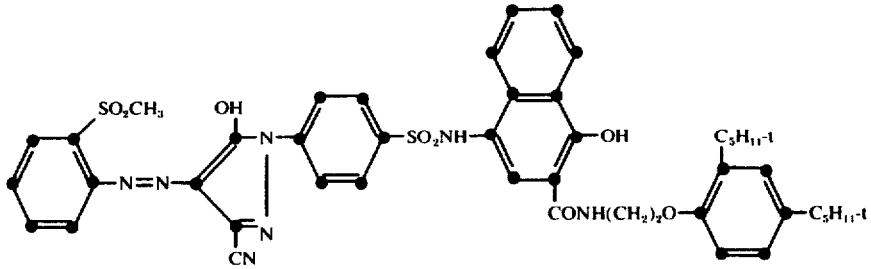

11. A compound according to claim 3 wherein

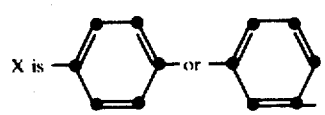

J is $-SO_2-$; and q is 1.

12. A photosensitive element according to claim 11 wherein

Y represents the atoms necessary to complete a naphthalene nucleus;

Z represents alkylsulfonyl having 1 to about 6 carbon atoms, cyano or a sulfamoyl radical having the formula $-SO_2NHR^4$ wherein $R^4$ is alkyl having 1 to about 4 carbon atoms; and M is hydrogen.

13. A compound according to claim 12 wherein —Ball is linked to the sulfonamidonaphthol nucleus through a bivalent —CONH— or —SO$_2$NH— moiety.

14. A compound according to claim 12 wherein —Ball represents

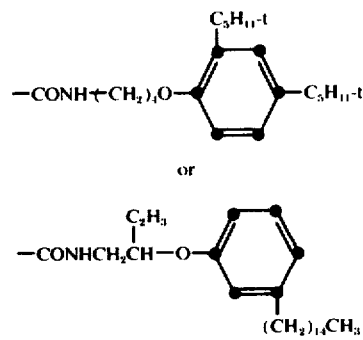

and is in the 2-position relative to the hydroxy group.

15. A compound according to claim 14 wherein E represents hydrogen, chloro or methoxy; and Z represents $-SO_2CH_3$, cyano or $-SO_2N(CH_3)_2$.

16. A yellow image dye-releasing compound having the formula

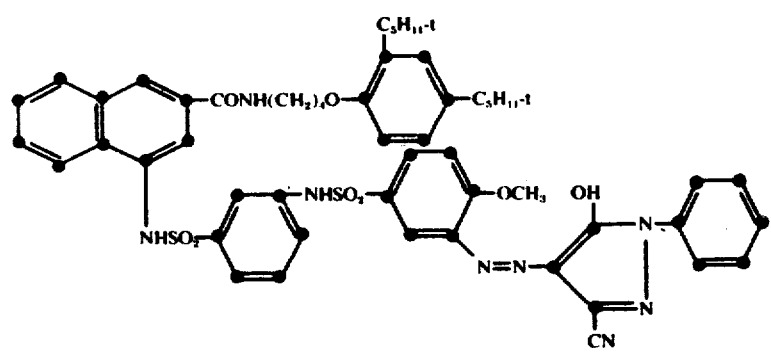
17. A yellow image dye-releasing compound having the formula
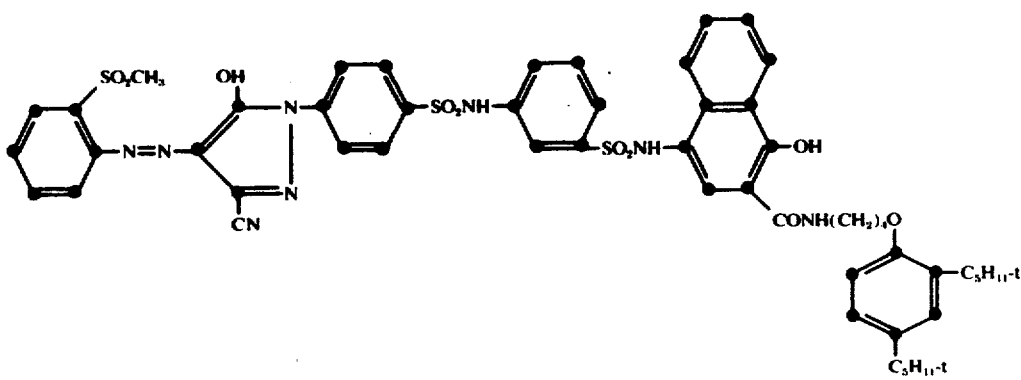
* * * * *